(12) United States Patent
Bouchez

(10) Patent No.: US 7,654,547 B2
(45) Date of Patent: Feb. 2, 2010

(54) CYCLE HEADSET

(75) Inventor: Julien Bouchez, Saint Germain des Pres (FR)

(73) Assignee: Look Cycle International, Nevers (FR)

( * ) Notice: Subject to any disclaimer, the term of this patent is extended or adjusted under 35 U.S.C. 154(b) by 18 days.

(21) Appl. No.: 11/876,790

(22) Filed: Oct. 23, 2007

(65) Prior Publication Data

US 2008/0100026 A1 May 1, 2008

(30) Foreign Application Priority Data

Oct. 26, 2006 (FR) .................................. 06 09430

(51) Int. Cl.
*B62K 21/00* (2006.01)
(52) U.S. Cl. ..................... 280/279; 280/276
(58) Field of Classification Search ................... 280/279
See application file for complete search history.

(56) References Cited

U.S. PATENT DOCUMENTS 5,297,811 A    3/1994  Chi

| | | | | |
|---|---|---|---|---|
| 5,893,574 A * | 4/1999 | Campagnolo | ............... | 280/279 |
| 6,431,575 B2 * | 8/2002 | Campagnolo | ............... | 280/279 |
| 7,204,502 B2 * | 4/2007 | Tange | .................. | 280/276 |
| 2001/0040353 A1 * | 11/2001 | Campagnolo | ............... | 280/279 |

FOREIGN PATENT DOCUMENTS

EP              0 541 070 A1      5/1993

* cited by examiner

*Primary Examiner*—Lesley D Morris
*Assistant Examiner*—Tashiana Adams
(74) *Attorney, Agent, or Firm*—Young & Thompson

(57) ABSTRACT

The headset rotationally connects a fork pivoting tube (1) to a steering tube (2) of a cycle frame. It includes a lower roller bearing (3), an upper roller bearing (4), and an element (9, 10) for axially locking the lower and upper roller bearings (3, 4) against a lower or upper end of the steering tube (2). The mechanism for axial locking includes a first element of axial locking that consists of a circular groove (9) that is provided on the outside face of the pivoting tube (1) that works with a second element of axial locking that consists of a rib (10) with an essentially matching shape that is provided on an elastically deformable annular element (11) in a direction that is perpendicular to the axis (A-A) of the pivoting tube (1) and placed above the upper roller bearing (4) so as to exert a thrust against the latter.

20 Claims, 4 Drawing Sheets

CYCLE HEADSET

BACKGROUND OF THE INVENTION

This invention relates to a cycle headset.

The cycle headset is used to connect a fork pivoting tube to a steering tube that forms part of a cycle frame.

For this purpose, any headset comprises a lower roller bearing and an upper roller bearing that create a connection that allows the rotation of the pivoting tube relative to the steering tube. It also comprises means of axially locking the lower and upper roller bearings against a lower or upper end of the steering tube.

The means of axially locking the lower and upper roller bearings on the standard headsets generally comprise a plug that is located at the top of the fork tube and that is supported inside the latter by an expander.

One problem that arises in the known headsets is the compensation for wear of roller bearings and axial holding of the bracket on the fork pivoting tube. This problem is solved in general by the use of a certain number of crosspieces that make it possible to obtain the desired height and to ensure the locking of the roller bearings.

The known headsets, however, comprise a large number of parts, and they are all relatively difficult to assemble both during manufacturing and during subsequent adjustment by the cyclist himself, which makes it necessary to adjust the roller bearings, which is otherwise unnecessary.

The purpose of the invention is to eliminate these drawbacks by proposing a headset whose assembly is extremely simple while ensuring the reliable locking of lower and upper roller bearings. The headset according to the invention also makes it possible to moderate or at least reduce the vibrations that are received from the front wheel and that in the known headsets are retransmitted to the frame virtually without attenuation. The service life of the roller bearing is increased in this manner.

SUMMARY OF THE INVENTION

The object of the invention is a cycle headset that can connect a fork pivoting tube to a steering tube that forms part of a cycle frame, comprising a lower roller bearing, an upper roller bearing so as to allow the rotation of the pivoting tube relative to the steering tube, and means of axially locking the lower and upper roller bearings against a lower or upper end of the steering tube, characterized by the fact that said means of axial locking comprise a first element of axial locking that consists of a circular groove that is provided on the outside face of the pivoting tube and that can work with a second means of axial locking that consists of a rib of essentially matching shape that is provided on an elastically deformable annular element in a direction that is perpendicular to the axis of the pivoting tube and placed above the upper roller bearing so as to exert a thrust against the latter.

According to other characteristics of the invention:

Said annular element has a slit;

Said annular element has the shape of a ring whose inside periphery constitutes said rib;

Said ring has a circular cross-section;

Said means of axial locking also comprise a compressible ring that is inserted between the upper roller bearing and a bearing surface that is formed by an inside shoulder in the steering tube;

Said elastically deformable annular element rests directly on the upper roller bearing;

Said elastically deformable annular element rests on the upper roller bearing via an annular cover;

An annular insert that is made of an elastic material is placed between said cover and the upper roller bearing;

Said insert has a lower wall with a small thickness extending into a gap that is defined between the outside periphery of the pivoting tube and the upper roller bearing;

An additional compressible ring is placed between the lower roller bearing and a bearing surface that is formed by a shoulder in a housing of the steering tube;

In the headset, the lower portion of the pivoting tube has a surface with an oblique cross-section that constitutes an outside bearing surface for the lower roller bearing and in which an annular insert that is made of elastic material that has a portion with an oblique cross-section is placed between the lower roller bearing and said surface with an oblique cross-section;

Said annular insert also has an upper cylindrical portion that extends into a gap that is defined between the outside periphery of the pivoting tube and the lower roller bearing;

Said elastically deformable annular element comprises a branch that extends vertically upward so as to form an element for attaching a bracket on the pivoting tube;

On a portion of its length at its top end, the pivoting tube comprises a flat surface so as to be integral in rotation with the bracket when the pivoting tube is inserted into a housing of matching shape that is provided in the central portion of the bracket and emerges on the lower face of the latter;

Said elastically deformable annular element has the shape of a slit sleeve on the inside periphery of which said rib is provided, and which on its outside periphery is provided with a threading that works with a nut that can be locked against the upper roller bearing;

Said nut rests against the upper roller bearing by way of an elastic ring;

The pivoting tube comprises several circular grooves that make it possible to adapt the pivoting tube to steering tubes of different lengths.

BRIEF DESCRIPTION OF THE DRAWINGS

Other characteristics and advantages of the invention will emerge from the following description of several nonlimiting embodiments of the invention, with reference to the accompanying figures in which.

Figure 1:
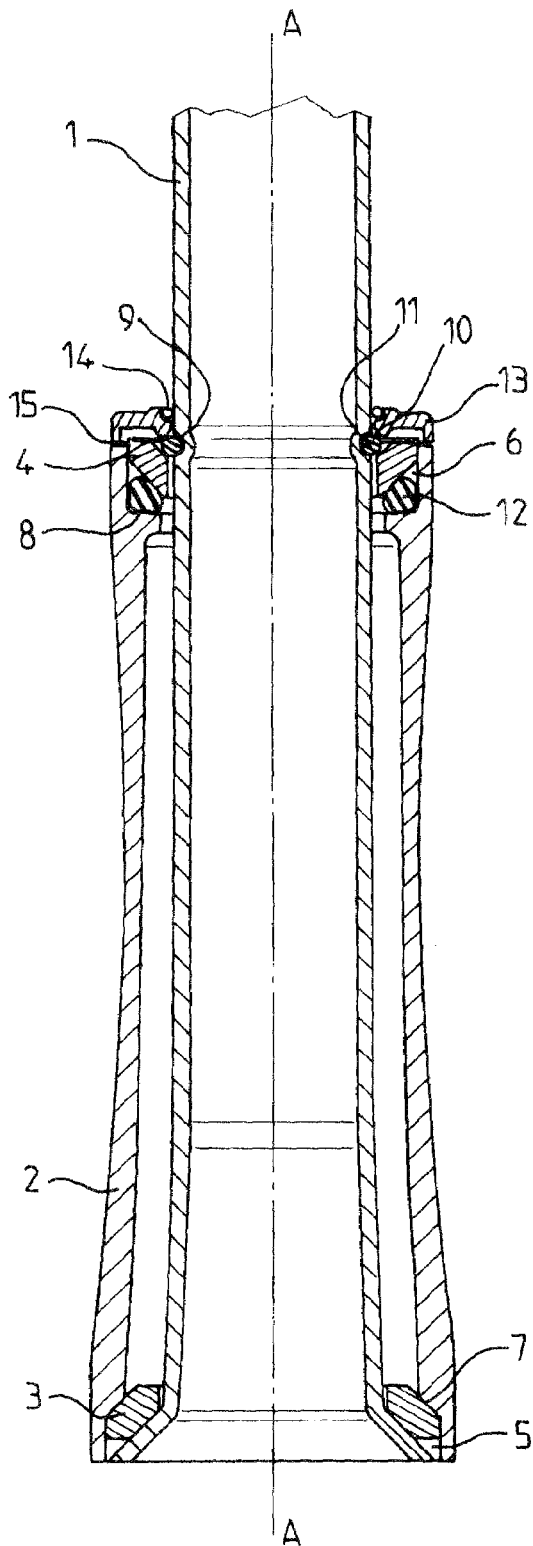
FIG. 1 is a longitudinal cutaway view of an assembled headset, according to a first embodiment of the invention.

Only the elements that relate directly to the invention are shown in the figures in which the identical or equivalent elements bear the same reference signs.

DETAILED DESCRIPTION OF THE PREFERRED EMBODIMENTS

A first embodiment will now be described with reference to FIGS. 1 to 3.

The headset is used to connect a fork pivoting tube 1 to a steering tube 2 that forms part of a cycle frame (not shown). The headset 2 comprises a lower roller bearing 3 and an upper roller bearing 4 that are placed at the lower or upper end of the steering tube 2 so as to constitute a rotational connection between these two tubes.

The lower and upper roller bearings 3, 4 are accommodated in a lower housing 5 or an upper housing 6 that are delimited by a respective annular shoulder 7, 8. In the example that is illustrated, the first shoulder 7 forms an inclined bearing surface, and the second shoulder 8 forms a bearing surface with a radial extension.

So as to eliminate the axial travel of the upper and lower roller bearings 3, 4, the headset comprises means of axially locking the roller bearings.

According to an important characteristic of the invention, these means of axial locking comprise a first element for axial locking that consists of a circular groove 9 that is provided on the outside face of the pivoting tube 1 and a second element of axial locking that consists of a rib 10 that is provided on an annular element 11 that is placed above the upper roller bearing 4 by resting on the latter, in a direct or indirect manner as will be explained below.

According to the invention, the annular element 11 is elastically deformable in a direction that is perpendicular to the axis A-A of the pivoting tube. It may be made of a metallic material or a polymer that has the desired elasticity.

The groove 9 has a shape that essentially matches that of the rib. Advantageously, the inside diameter of the rib 10 is slightly reduced relative to that of the groove 9 such that the rib can be accommodated in the groove by ratcheting.

According to another characteristic of the invention, the annular element has a slit so as to open elastically during the assembly.

Figure 2:
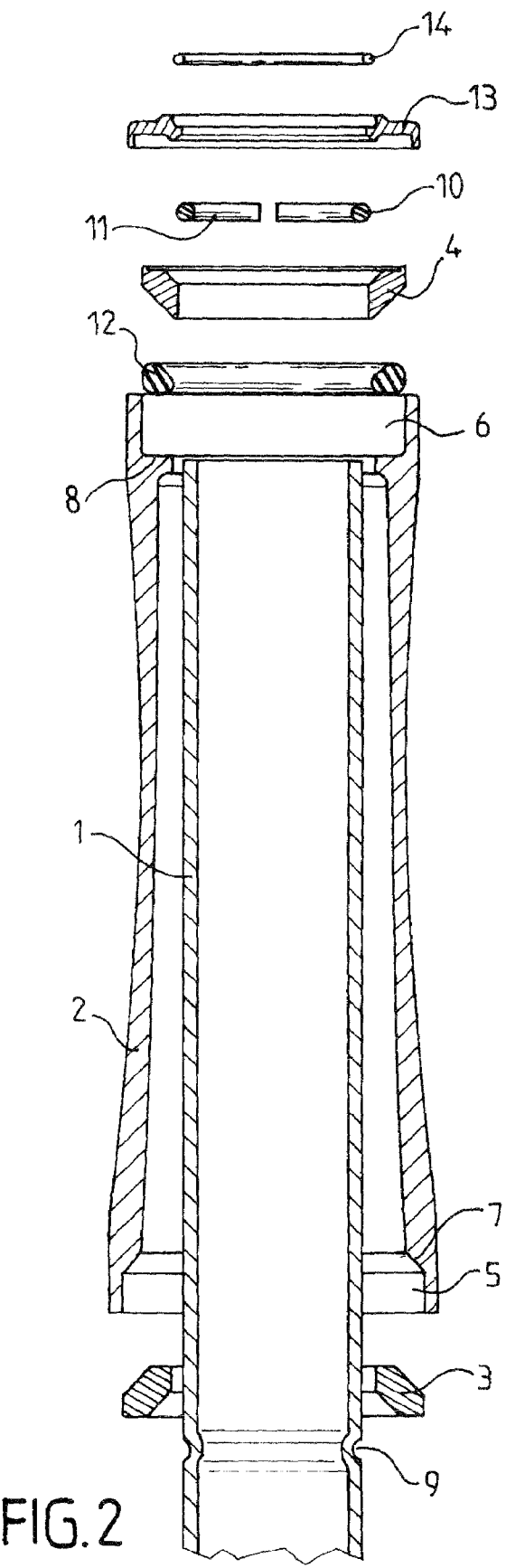
FIG. 2 is an exploded view of the elements of FIG. 1, before assembly.
Figure 3:
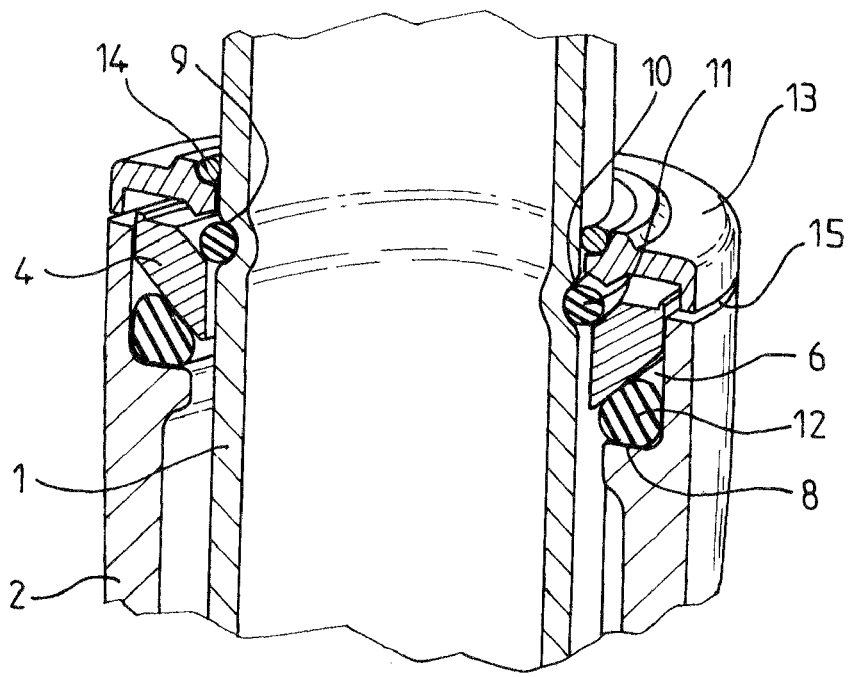
FIG. 3 is a perspective view on an enlarged scale of the upper portion of the headset of FIGS. 1 and 2.

In the embodiment that is shown in FIGS. 1 to 3, the annular element 11 has the shape of a ring, preferably with an annular section.

The position in height of the groove 9 on the pivoting tube is adapted to the upper roller bearing position 4 so that the annular element 11 exerts a downward thrust against the upper roller bearing 4, which also has the consequence that the lower roller bearing 3 is pulled upward due to the flared shape of the lower end of the pivoting tube 1 that abuts against the lower roller bearing 3 when the pivoting tube 1 is moved upward inside the steering tube 2.

According to another characteristic of the invention, the means of axial locking also comprise a compressible ring 12 that is inserted between the upper roller bearing 4 and the bearing surface that is formed by the shoulder 8 of the upper housing 6.

The compressible ring 12 is compressed during the assembly of the headset and remains in this compressed state to act as a means of compensation for the travel of the lower and upper roller bearings 3, 4 and the shock-absorbing means by reducing the vibrations that are obtained from the front wheel (not illustrated).

Preferably, the lower face of the upper roller bearing 4 is oblique so as to compress the compressible ring 12 in the direction of the angle that is formed by the shoulder 8 and the vertical wall of the housing 6.

The headset is conventionally closed upward by an annular cover 13 that protects the upper roller bearing 4 by being supplemented in the upward direction by a sealing joint 14 resting against its upper face around the hole that is defined by the cover. The cover 13 has in cutaway the shape of a C of which one inside end rests against the upper portion of the annular element 11, while the outside end defines a gap 15 relative to the upper end of the steering tube 2 so as not to hinder the rotation of the pivoting tube 1.

The pivoting tube 1 can further comprise several circular grooves 9 (see FIG. 7) that make it possible to adapt the pivoting tube to steering tubes with different lengths that correspond to frameworks of different sizes.

Figure 4:
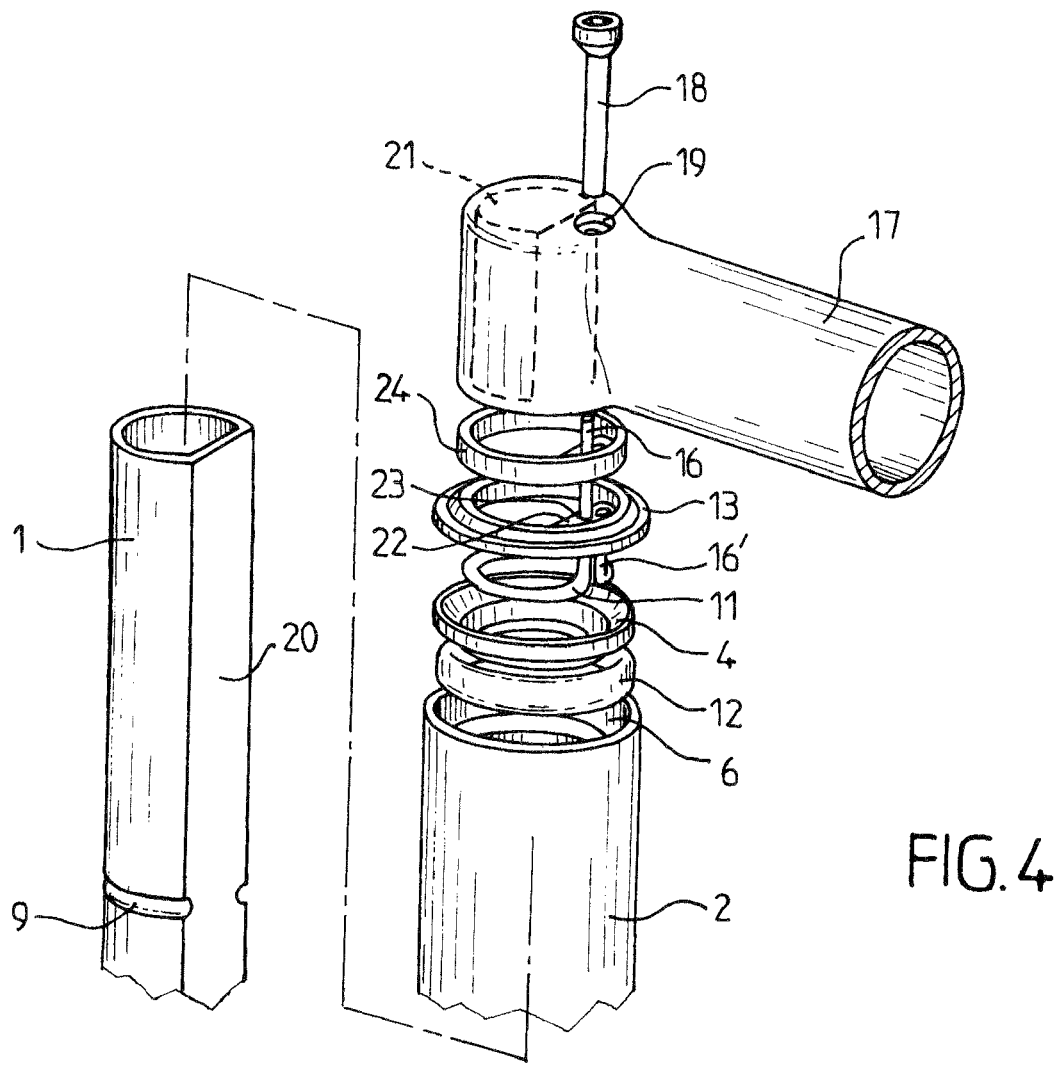
FIG. 4 is a perspective exploded view that diagrammatically illustrates a variant of the first embodiment of the invention that also makes possible the attachment of the bracket.

FIG. 4 shows a variant of the embodiment that is described with reference to FIGS. 1 to 3. In this variant, the second locking element that is formed by the annular element 11 comprises a branch 16 that extends vertically upward so as to form an attachment element of a bracket 17 on the pivoting tube 1. This attachment element comprises a threading (not shown) that is able to work with a threaded rod 18 that forms a nut.

The threaded rod extends through a hole 19 into the central portion of the bracket 17 to be screwed onto the threaded branch 16 of the annular element to thus attach the bracket.

On a portion of its length at its top end, the pivoting tube 1 comprises a flat surface 20 so as to make it solid in rotation with the bracket 17 when the pivoting tube 1 is inserted into a housing 21 of matching shape that is provided in the central portion of the bracket and that emerges on the lower face of the latter. This housing 21 is indicated in broken lines in FIG. 4.

This shape at the top end of the pivoting tube 1 also appears again, in a complementary manner, in the annular cover 13, which here comprises a fabric segment 22 that is provided with a hole 23 for the passage of the branch 16 of the annular element 11 that can furthermore comprise a second branch 16' that extends vertically in parallel to the first branch 16 by a corresponding hole in the fabric segment 22.

In the example that is illustrated in FIG. 4, the headset comprises an annular crosspiece 24 that is placed between the cover 13 and the lower face of the bracket 17. This crosspiece 24 can also, as shown in FIG. 4, be provided with a fabric segment that is pierced by one or two holes for passage for the branch or branches 16, 16' of the annular element 11.

Figure 5:
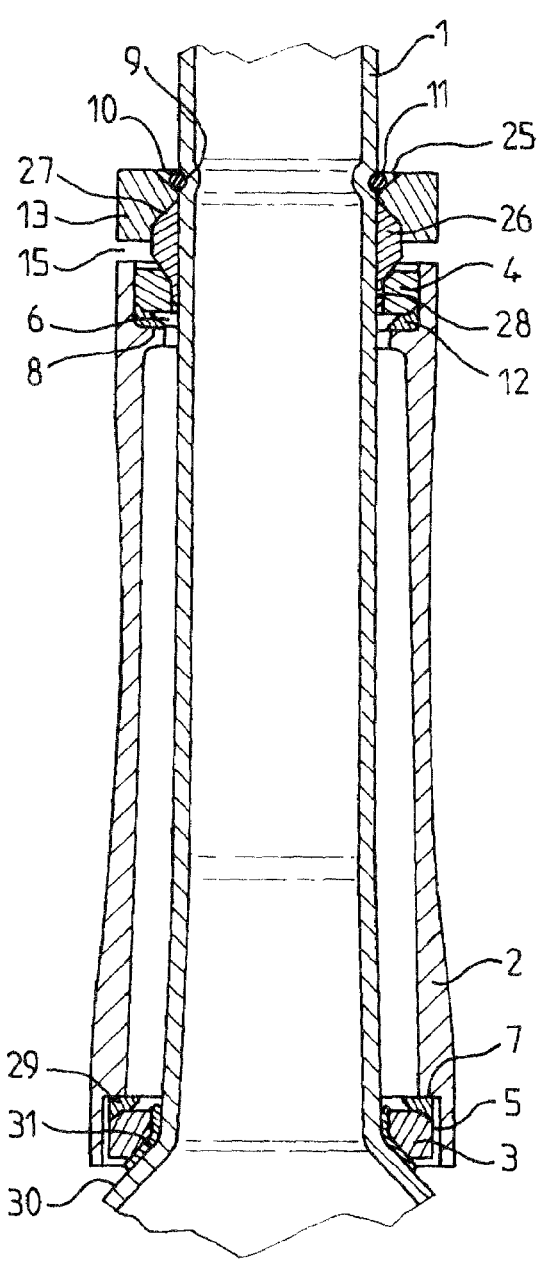
FIG. 5 is a longitudinal cutaway view of an assembled headset, according to a second embodiment of the invention.
Figure 6:
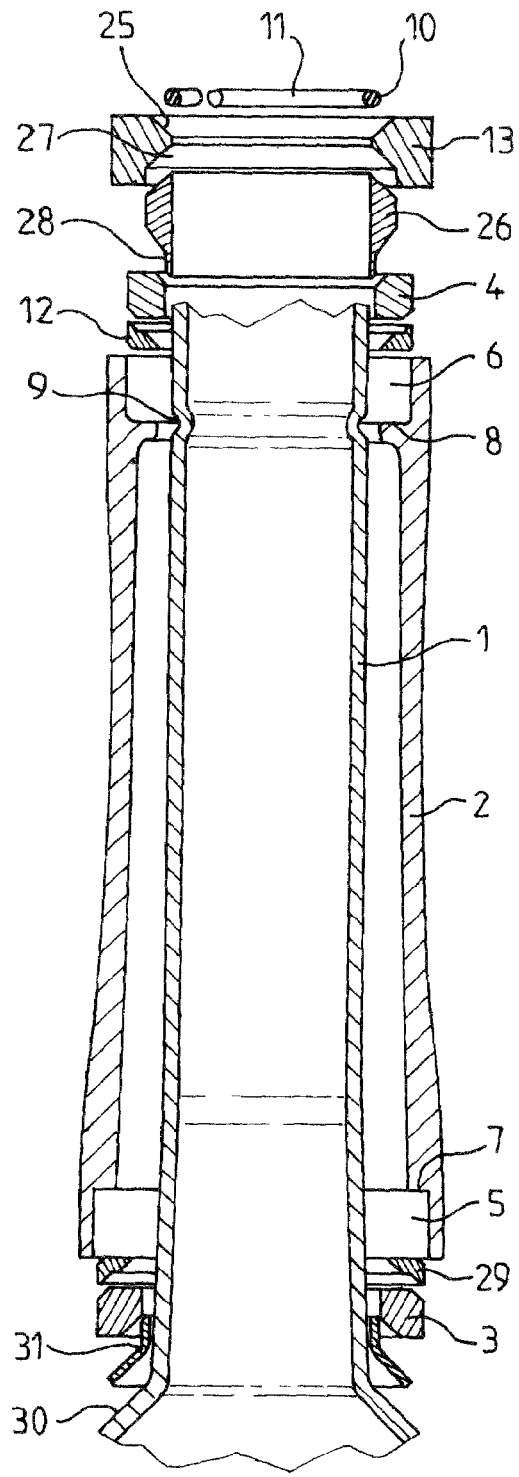
FIG. 6 is an exploded view of the elements of FIG. 5, before assembly.

FIGS. 5 and 6 show a second embodiment of the invention in which the second locking element in the form of an annular element 11 is placed in a groove that is made on the upper or outside face of an annular cover 13. The annular element 11 thus rests against the upper roller bearing via this cover 13.

So as to better absorb the vibrations, an annular insert 26 that is made of an elastic material is preferably placed between the cover 13 and the upper roller bearing 4.

The upper portion of the insert 26 is accommodated in a housing 27 that is provided on the lower face of the cover 13.

The insert 26 advantageously has a lower wall 28 with a small thickness that extends into a gap that is defined between the outside periphery of the pivoting tube 1 and the upper roller bearing 4 so as to eliminate any radial play of the latter.

In the example that is illustrated in FIGS. 5 and 6, the lower shoulder 7 of the steering tube 2 extends radially to define the lower housing 5 that receives additional means that are intended to better damp the vibrations. These means comprise an additional compressible ring 29 that is placed between the lower roller bearing 3 and the bearing surface that is formed by the shoulder 7 of the housing 5 in the steering tube 2.

The lower portion of the pivoting tube has a surface with an oblique cross-section 30 that constitutes an outside bearing surface for the lower roller bearing 3. According to the invention, an annular insert 31 that is made of an elastic material that has a portion with an oblique cross-section is placed between the lower roller bearing and the oblique surface 30.

This annular insert 31 advantageously also has an upper cylindrical portion that extends into a gap that is defined between the outside periphery of the pivoting tube 1 and the lower roller bearing 3.

Figure 7:
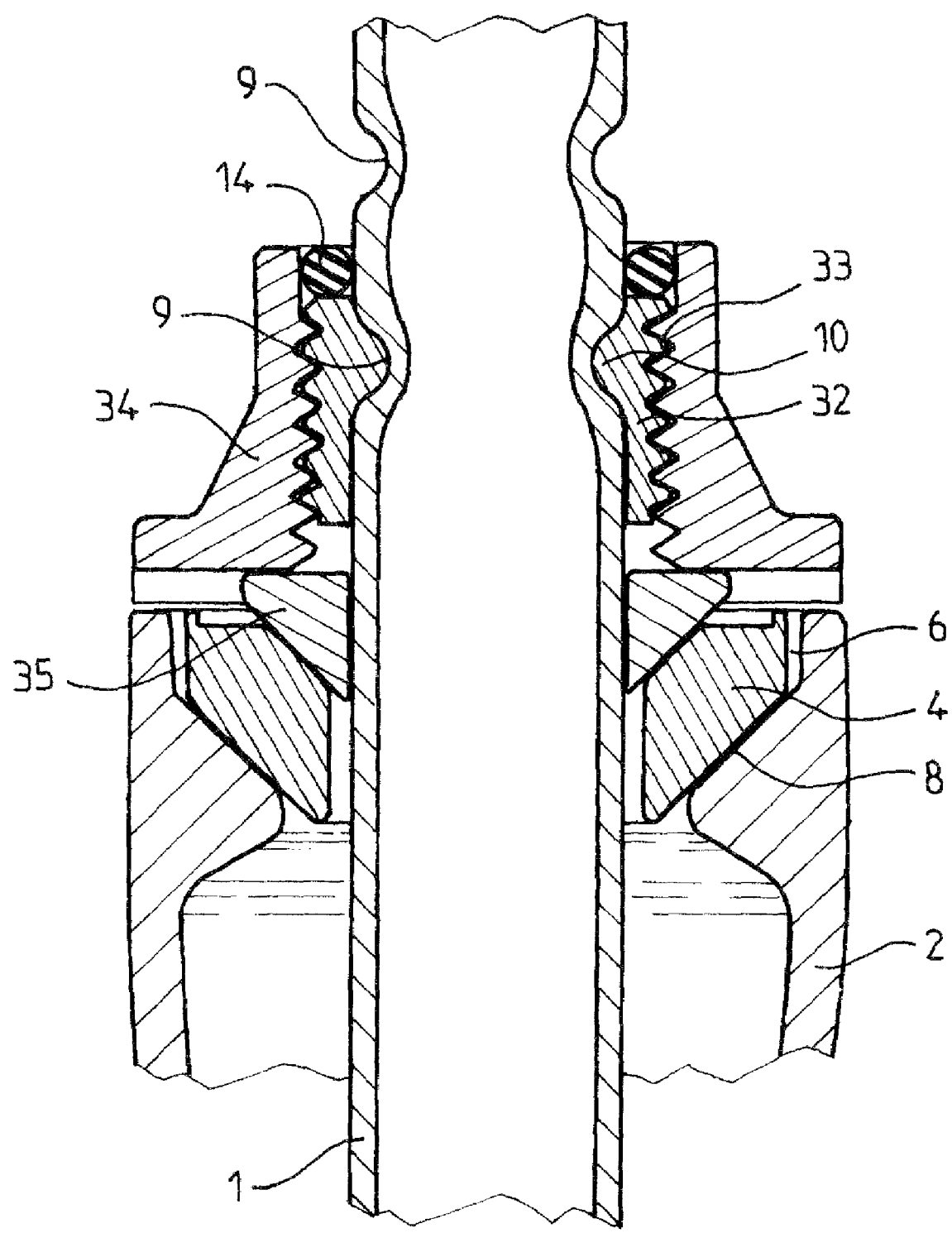
FIG. 7 is a partial diagrammatic view in longitudinal section of a headset according to a third embodiment of the invention.

FIG. 7 shows a third embodiment of a headset according to the invention. Here, the second element of axial locking in the form of an elastically deformable annular element in a direction that is perpendicular to the axis A-A of the pivoting tube 1 has the shape of a sleeve 32 on the inside periphery of which a rib 10 is provided to work with one among several circular grooves 9 that are provided on the pivoting tube 1. Preferably, this sleeve 32 has a slit.

On its outside periphery, the sleeve 32 is provided with a threading 33 that works with a nut 34 that can be locked against the upper roller bearing 4.

Preferably, the nut rests against the upper roller bearing 4 via an elastic ring 35 that may or may not have a slit.

Of course, the invention is not limited to the examples that are illustrated and described; one skilled in the art can easily combine the various characteristics to attain other variants without thereby exceeding the scope of the invention.

The invention claimed is:

1. A cycle headset for connecting a fork pivoting tube (1) to a steering tube (2) that forms part of a cycle frame, comprising:
    a fork pivoting tube (1) having an outside face;
    a lower roller bearing (3);
    an upper roller bearing (4) configured to provide for rotation of the pivoting tube (1) relative to the steering tube (2); and
    means (9, 10) of axially locking the lower and upper roller bearings (3, 4) against a lower or upper end of the steering tube (2),
    wherein said means of axial locking comprise a first element of axial locking that consists of a circular groove (9), said circular groove (9) provided on the outside face of the pivoting tube (1) and configured to interface with a second element of axial locking that consists of a rib (10) of essentially matching shape to the circular groove (9) and provided on an elastically deformable annular element (11, 32) in a direction perpendicular to an axis of the pivoting tube and provided above the upper roller bearing (4) so as to exert a thrust against the upper roller bearing (4).

2. The headset according to claim 1, wherein said annular element (11, 32) has a slit.

3. The headset according to claim 1, wherein said annular element has a ring shape (11) with an inside periphery constituting said rib (10).

4. The headset according to claim 3, wherein said ring (11) has a circular cross-section.

5. The headset according to claim 1, wherein said means of axial locking (9, 10) also comprise a compressible ring (12) inserted between the upper roller bearing (4) and a bearing surface formed by an inside shoulder (8) in the steering tube (2).

6. The headset according to claim 1, wherein said elastically deformable annular element (11) rests directly on the upper roller bearing (4).

7. The headset according to claim 1, wherein said elastically deformable annular element (11) rests on the upper roller bearing (4) by means of an annular cover (13).

8. The headset according to claim 7, wherein an annular insert (26) made of an elastic material is placed between said cover (13) and the upper roller bearing (4).

9. The headset according to claim 8, wherein said insert (26) has a lower wall with a small thickness extending into a gap defined between an outside periphery of the pivoting tube (1) and the upper roller bearing (4).

10. The headset according to claim 1, wherein an additional compressible ring (29) is provided between the lower roller bearing (3) and a bearing surface formed by a shoulder (7) in a housing (5) of the steering tube (2).

11. The headset according to claim 1,
    wherein the lower portion of the pivoting tube (1) has a surface with an oblique cross-section (30) constituting an outside bearing surface for the lower roller bearing (3), and
    wherein an annular insert (31), made of elastic material and having a portion with an oblique cross-section, is provided between the lower roller bearing (3) and said surface with an oblique cross-section (30).

12. The headset according to claim 11, wherein said annular insert (31) also has a cylindrical upper portion that extending into a gap defined between an outside periphery of the pivoting tube (1) and the lower roller bearing (3).

13. The headset according to claim 2, wherein said elastically deformable annular element (11) comprises a branch (16) extending vertically upward to form an element for attaching a bracket (17) on the pivoting tube (1).

14. The headset according to claim 13, wherein the pivoting tube (1) comprises, on a portion of its length at it top end, a flat surface (20) configured to be integral in rotation with the bracket (17) when the pivoting tube (1) is inserted into a housing (21) of a matching shape provided in the central portion of the bracket (17) and that emerges on the lower face of the bracket (17).

15. The headset according to claim 1, wherein said elastically deformable annular element is shaped as a slit sleeve (32) on an inside periphery of which said rib (10) is provided, and which on an outside periphery is provided with a threading (33) configured to interface with a nut (34) that is lockable against the upper roller bearing (4).

16. The headset according to claim 15, wherein said nut (34) rests against the upper roller bearing (4) via an elastic ring (35).

17. The headset according to claim 1, wherein the pivoting tube (1) comprises several circular grooves (9) configured to adapt the pivoting tube (1) to steering tubes (2) with different lengths.

18. The headset according to claim 2, wherein said means of axial locking (9, 10) also comprise a compressible ring (12) inserted between the upper roller bearing (4) and a bearing surface formed by an inside shoulder (8) in the steering tube (2).

19. The headset according to claim 3, wherein said means of axial locking (9, 10) also comprise a compressible ring (12) inserted between the upper roller bearing (4) and a bearing surface formed by an inside shoulder (8) in the steering tube (2).

20. A cycle headset for connecting a fork pivoting tube (1) to a steering tube (2) forming part of a cycle frame, comprising:
    a lower roller bearing (3);
    an upper roller bearing (4) configured to provide for rotation of the pivoting tube (1) relative to the steering tube (2); and means (9, 10) of axially locking the lower and upper roller bearings (3, 4) against a lower or upper end of the steering tube (2),
wherein said means of axial locking comprise a rib (10) configured to interface with a circular groove (9) provided on an outside face of the pivoting tube (1),
wherein the rib (10) has a shape essentially matching the circular groove (9), and
wherein the rib (10) is provided on an elastically deformable annular element (11, 32) in a direction perpendicular to an axis of the pivoting tube and provided above the upper roller bearing (4) so as to exert a thrust against the upper roller bearing (4).

\* \* \* \* \*